(12) United States Patent
Szajnowski (10) Patent No.: US 8,031,106 B2
(45) Date of Patent: Oct. 4, 2011

(54) OBJECT RANGING

(75) Inventor: Wieslaw Jerzy Szajnowski, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 12/624,320

(22) Filed: Nov. 23, 2009

(65) Prior Publication Data

US 2010/0141504 A1 Jun. 10, 2010

(30) Foreign Application Priority Data

Nov. 24, 2008 (EP) .................................. 08253797

(51) Int. Cl.
*G01S 13/42* (2006.01)
*G01S 13/62* (2006.01)

(52) U.S. Cl. ............ 342/70; 342/85; 342/109; 342/114; 342/115; 342/128; 342/137

(58) Field of Classification Search .............. 342/70–72, 342/85, 109, 112, 114, 115, 128–132, 134–137
See application file for complete search history.

(56) References Cited

U.S. PATENT DOCUMENTS

| 4,106,020 | A | * | 8/1978 | Johnson ......................... 342/128 |
| 5,151,702 | A | | 9/1992 | Urkowitz |
| 5,274,380 | A | | 12/1993 | Yatsuka et al. |
| 5,376,939 | A | | 12/1994 | Urkowitz |
| 5,517,197 | A | * | 5/1996 | Algeo et al. .................... 342/70 |
| 5,768,131 | A | | 6/1998 | Lissel et al. |
| 6,104,336 | A | | 8/2000 | Curran et al. |
| 6,396,436 | B1 | | 5/2002 | Lissel et al. |
| 6,606,052 | B1 | | 8/2003 | Miyahara |
| 6,677,887 | B2 | * | 1/2004 | Harman .......................... 342/28 |
| 7,002,512 | B2 | | 2/2006 | Isaji |
| 7,148,840 | B2 | * | 12/2006 | Dooi et al. .................... 342/131 |
| 7,190,305 | B2 | | 3/2007 | Isaji |
| 7,466,261 | B1 | * | 12/2008 | Hoctor et al. ................. 342/137 |

FOREIGN PATENT DOCUMENTS

| EP | 1925948 A1 | | 5/2008 |
| EP | 2189809 A1 | * | 5/2010 |
| JP | 2004-151022 A | | 5/2004 |

OTHER PUBLICATIONS

Jankiraman et al., "System Design and Verification of the Pandora Multifrequency Radar", International Conference on Radar Systems, Brest, France, May 17-21, 1999, pp. 1-6.

(Continued)

*Primary Examiner* — John B Sotomayor
(74) *Attorney, Agent, or Firm* — Birch, Stewart, Kolasch & Birch LLP (57) ABSTRACT

A method for determining at least one of the distance to and the speed of an object is discussed. The method comprises determining an indication of whether the object is approaching or moving away and generating an interrogation signal comprising a sequence consisting of segments at constant frequency and segments of varying frequency, wherein if the determining step indicates the object is approaching then the varying frequency segments have decreasing frequency and if the determining step indicates that the object is moving away then the varying frequency segments have increasing frequency. The interrogation signal is transmitted and a version of the interrogation signal reflected from the object is detected. At least one of the distance to and speed of the object is then determined using a combination of the interrogation signal and the reflected version of the interrogation signal.

14 Claims, 10 Drawing Sheets

OTHER PUBLICATIONS

Kretschmer et al., "Doppler Properties of Polyphase Coded Pulse Compression Waveforms", IEEE Transactions on Aerospace and Electronic Systems, vol. AES-19, No. 4, Jul. 1983, pp. 521-531.

Rohling et al., "Waveform Design Principles for Automotive Radar Systems", International Conference on Radar, Beijing, China, Oct. 15-18, 2001, pp. 1-4.

* cited by examiner

OBJECT RANGING

FIELD OF THE INVENTION

This invention relates to a method for determining at least one of the distance to and velocity of an object using, for example, a microwave radar with a frequency modulated carrier, and is especially, but not exclusively, applicable to automotive radar with a dynamic adaptation or selection of the modulating waveform in response to object velocity.

DESCRIPTION OF PRIOR ART

One of many systems employed for automotive warning and collision avoidance is frequency modulated continuous wave (FM-CW) radar. Such a system, shown in a block form in FIG. 1, has a voltage controlled oscillator 1 in which the frequency of a carrier generated by an oscillator 3 is linearly swept over time duration $T_{SW}$ and a predetermined frequency range $\Delta F$ using a frequency modulator 5. In particular, a modulation pattern is provided by a linear waveform generator 7 under the control of a control module (not shown in FIG. 1). The frequency modulated continuous wave (FM-CW) signal is coupled by a coupler 9 to a power amplifier 11 to generate an amplified signal which is coupled to an antenna 13.

Figure 1:
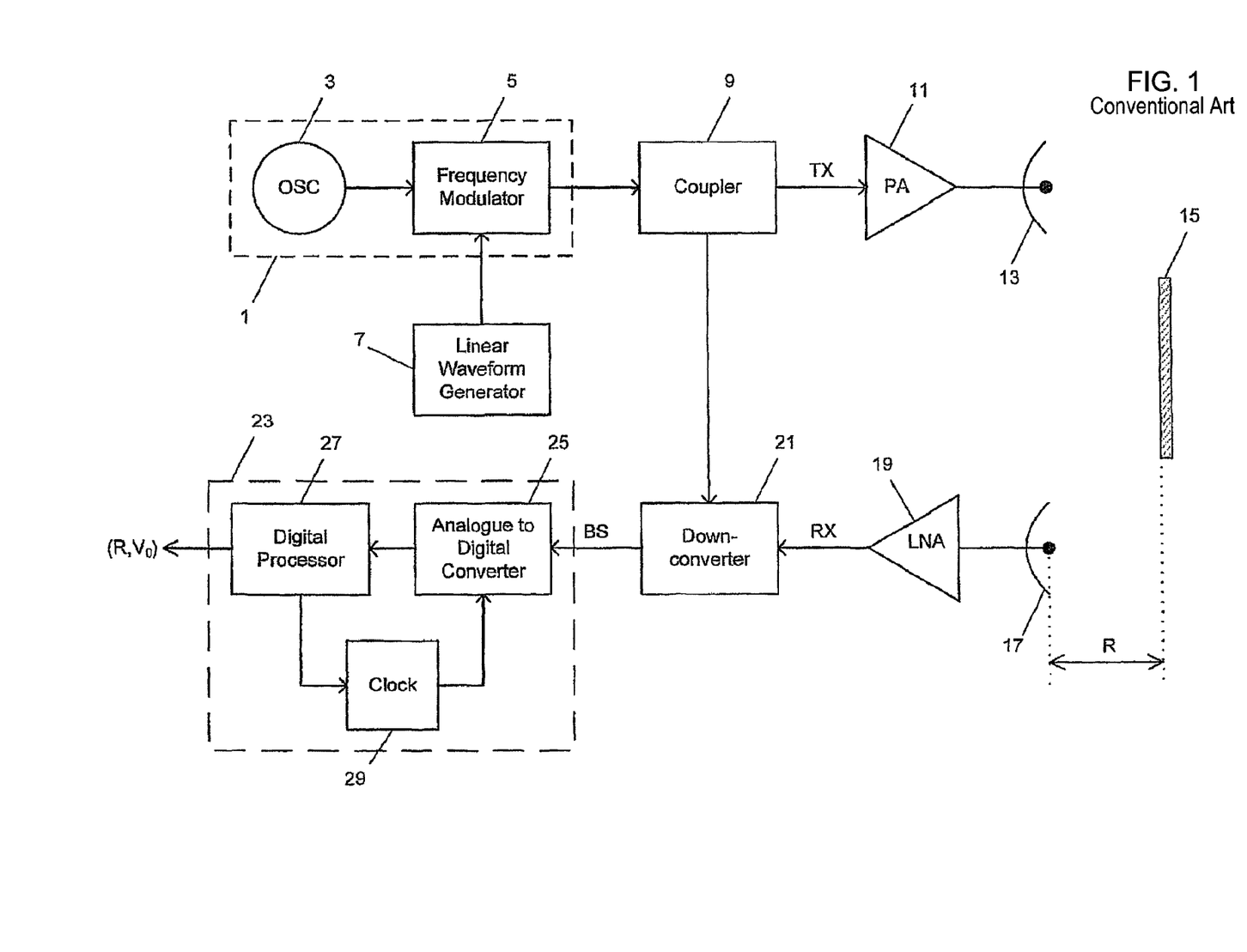
FIG. 1 shows a block diagram of a conventional FM-CW radar system used for automotive collision avoidance.

The transmission signal TX is directed towards a stationary obstacle 15 of interest. The reflected signal RX, delayed by a time $\tau$ proportional to the object distance R, is detected by the receive antenna 17 and coupled to a low-noise amplifier 19. The output of the low noise amplifier 19 is mixed in a down-converter 21 with a reference signal formed by a version of the transmitted signal received from the coupler 9. Because the received pulsed signals are delayed with respect to those transmitted, the instantaneous frequencies of the transmitted and received signal are different at any point.

Therefore, a beat signal BS is obtained at the output of the downconverter 21, with a frequency $F_B$, which is directly proportional to the unknown distance R to the stationary obstacle. The output of the downconverter 21 is delivered to a signal processor module 23, which comprises an analogue-to-digital converter (ADC) 25 and a digital processor 27 driven by timing pulses from a clock 29. The ADC 25 converts the signal from the downconverter 21 into a digital signal used by the digital processor 27 to determine the beat frequency $F_B$ and hence the range R of the object.

Figure 2A:
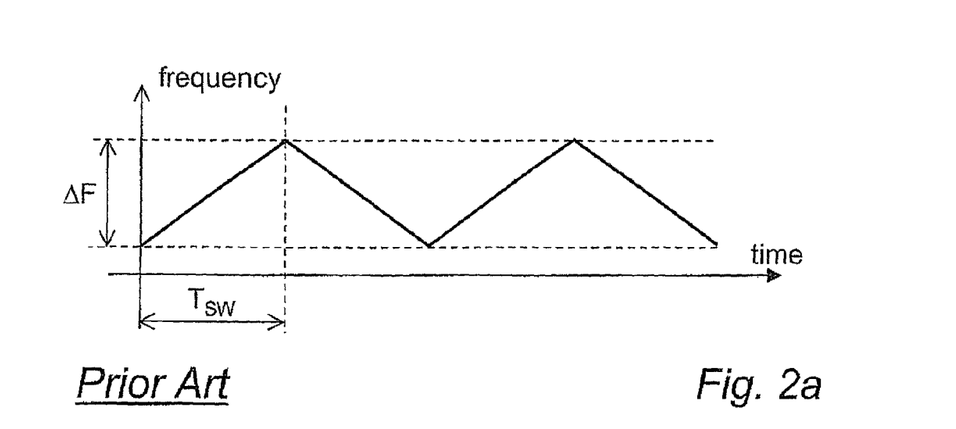
FIG. 2a shows a triangular modulation waveform used to modulate frequency in the VCO of a FM-CW radar system of FIG. 1.
Figure 2B:
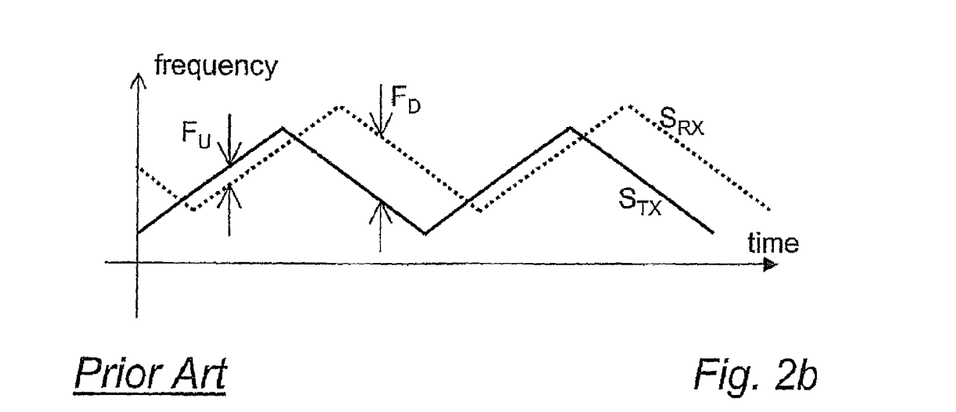
FIG. 2b shows transmitted, $S_{TX}$, and received, $S_{RX}$, triangular modulation waveforms in the FM-CW radar system of FIG. 1.
Figure 4:
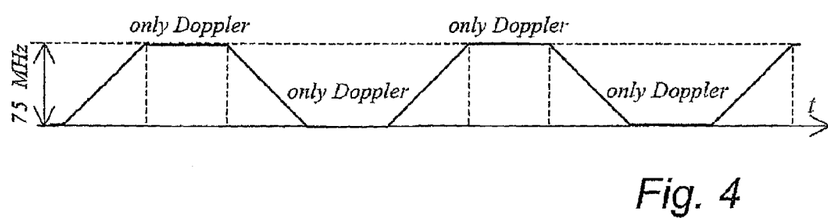
FIG. 4 shows a trapezoidal modulation waveform which also may be used in the FM-CW radar system of FIG. 1.

The frequency modulation pattern provided by the linear waveform generator 7 may follow, for example, a periodical triangular waveform with a constant slope of alternating sign, as shown in FIG. 2a. Employing this particular waveform is often preferred to other linear modulation schemes (such as sawtooth) since it also allows estimation of the velocity $V_O$ of moving obstacles from a pair of differential frequency shifts $F_U$ and $F_D$ derived from modulating waveform $S_{TX}$ and its delayed replica $S_{RX}$ (see FIG. 2b) which correspond to rising and falling parts of the triangular waveform, as follows:

$$R = \frac{(F_D + F_U)T_{SW}c}{4\Delta F} \quad (1)$$

$$V_O = \frac{(F_D - F_U)\lambda_O}{4} \quad (2)$$

where $\lambda_O$ is the wavelength of the transmitted signal TX
c is speed of light (~$3\times10^8$ m/s)
$\Delta F$ is frequency deviation
$T_{SW}$ is duration of single slope Alternatively, a trapezoidal-shape waveform such as that shown in FIG. 4 may be employed for modulation of carrier frequency. The flat parts of such a waveform result in constant-frequency transmission, which in the FM-CW radar arrangements, such as that shown in FIG. 1, results in a beat signal with a frequency $F_V$ equal to the so the called Doppler frequency shift resulting from motion of the object. The magnitude of $F_V$ depends only on the object's velocity $V_O$, but not on the measured distance R.

It is well known that radars based on such an FM-CW technique, and digitally-derived equivalents, operating with the same RF bandwidth can cause mutual interference, and may not offer adequate performance, for example, when multiple similar and dissimilar radar systems operate in a close proximity, as is particularly required in automotive applications.

One of the reasons for potentially inadequate multi-user performance is a phenomenon called FM-AM conversion noise. In an FM-CW radar using a triangular waveform to obtain a large frequency deviation of the transmitted carrier, an AM component having a similar frequency to the modulating signal may be superimposed on the frequency-modulated waveform. Typically, this is mainly due to nonlinearities in output power-frequency characteristic of the VCO in the radar transmitter. An AM component from such a characteristic may be detected by the downconverter 21 (see FIG. 1). Since the frequency of the triangular wave used for frequency modulation is generally close to the frequency of the echo signal from the ranged object when frequency-demodulated, the reception signal to noise ration is degraded. As a result, the output power from the power amplifier 11 needs to be increased to maintain the required operational range.

There are several known methods aimed to minimize unwanted effects from FM-AM conversion to enable measurement performance to be maintained to some degree in a multi-user scenario. For example, U.S. Pat. No. 5,274,380 by H. Yatsuka discloses a method which proposes a switching radar system in which the transmitter wave is switched at an appropriate frequency. Only an intermediate frequency based on the switching frequency is extracted. The method assumes that operation of the radar transmitter is interrupted in a periodic manner to allow reception of only the interfering signals from other radar systems, thus providing a background for discrimination of signals reflected from the intended ranged objects when transmission is resumed. The system may also be able to monitor the switching frequency of an interfering wave for a given time and thereby set the switching frequency of the system and the intermediate frequency to different values. However, such a radar system can be complex because it requires the presence of a plurality of oscillators and band-pass filters which need to be adaptively selected according to the properties of interference.

Other prior-art techniques that are aimed at improving interference rejection capabilities of FM-CW radars are primarily based on agile wideband frequency modulation using various coding waveforms. For example, polyphase-coded and Costas-coded waveforms have been considered among the best candidates for operation of a large number of radar systems in a shared spectrum. Examples of selected solutions based on these techniques are described in U.S. Pat. No. 5,151,702, U.S. Pat. No. 5,376,939, Kretschmer "Doppler Properties of Polyphase Coded Pulse Compression Waveforms" published in IEEE Trans. Aerosp. Electron. Syst., 1983, 19, (4), pp. 521-531, Jankiraman et. al. in the article "System Design and Verification of the PANDORA Multifrequency Radar" presented on Int'l. Conf on Radar Syst., Brest, France, 17-21 May 1999.

Another possible solution, proposed for example by Lissel (U.S. Pat. No. 5,768,131), potentially offering multi-user capabilities involves the use of a stepped-chirp waveform. Such an approach splits the full modulation bandwidth of FM chirp into a sequence of overlapping, narrow-band sub-chirps, which may also overlap in frequency. As the receiver is only tuned to the narrow-band sub-chirp, it offers high rejection to other radars transmitting at other sub-bands. The sub-chirps may be suitably selected following a random or pseudorandom pattern (i.e. Costas waveform). Furthermore, each sub-chirp could be transmitted opportunistically (or adaptively) when its sub-band is free.

In U.S. Pat. No. 6,396,436 B1 Lissel refers to another technique where frequency modulation within a chirp follows a different pattern i.e. triangle with different slopes, constant amplitude (constant frequency), random. While the main purpose of the method is to allow ranging of several obstacles with high accuracy, it is claimed that it may also offer multi-user capabilities.

Use of up-slope, down-slope and constant amplitude segments in the waveform used to modulate the frequency of the transmitted carrier is proposed by Curran in U.S. Pat. No. 6,104,336. The segments are used in a sequential and periodic manner. However, the invention also offers improved ranging and tracking capabilities while detecting several vehicles even closely positioned and moving at similar velocities.

Use of a modulation pattern comprising of triangular segments having different amplitudes and periods is proposed by Isaji in U.S. Pat. No. 7,002,512 B2. Other segment shapes, such as arc-like, with randomly selected parameters, are also proposed. The main purpose of the method is to enable tracking of multiple objects in range and velocity. However, the author claims that the method also enables discrimination of received signals related to ranged objects from noise and other interfering signals.

Another technique, related to the approach presented above, has been described by H. Rohling in the paper "Waveform Design Principles for Automotive Radar Systems" presented at International Conference Radar 2001, Beijing, China. The proposed technique is based on a combination of linear frequency modulation (LFM) and frequency shift keying (FSK) and it is aimed at unambiguous range and velocity measurement with high resolution and accuracy in multi-target situations. Because of the complexity of the modulation scheme, this approach is also claimed by the author to offer multi-user capabilities, although the scheme was not evaluated in this respect.

Nevertheless, the approaches mentioned above, aiming to enable multi-user capabilities in FM-CW radars, may substantially increase the complexity of the implemented signal-processing schemes, and therefore may not be considered as desirable solutions for low-cost applications such as automotive collision avoidance/warning systems intended for a mass market. It would therefore be desirable to develop a novel signal-processing method and an apparatus for improving the performance of FM-CW radar operating in multi-user scenarios in a more efficient or effective way than provided by prior-art techniques, especially in applications for vehicular collision-avoidance and/or collision-warning systems.

SUMMARY OF THE INVENTION

Aspects of the invention are set out in the accompanying claims.

In a stationary FM-CW radar, the distance R to a stationary obstacle OB is determined from the beat frequency $F_B$ between the frequency of the modulating waveform $S_{TX}$ and its delayed replica $S_{RX}$ derived from signal RX reflected from the obstacle, which may be determined as follows:

$$F_B \equiv F_R = \frac{2R\Delta F}{cT_{SW}} \tag{3}$$

where c is the speed of light, and $\Delta F$ is the frequency excursion during the sweep of duration $T_{SW}$. For example, when $\Delta F=75$ MHz and $T_{SW}=3.5$ ms, a stationary obstacle at a distance of R=1.5 m will produce the beat frequency $F_B \approx 212$ Hz.

When there is a relative movement between an obstacle and the FM-CW system, the observed beat frequency $F_B$ will comprise two components:

$F_R$—due to the distance R alone
$F_V$—due to the relative velocity $V_O$

Hence:

$$F_B = F_R \pm F_V \tag{4}$$

Figure 3:
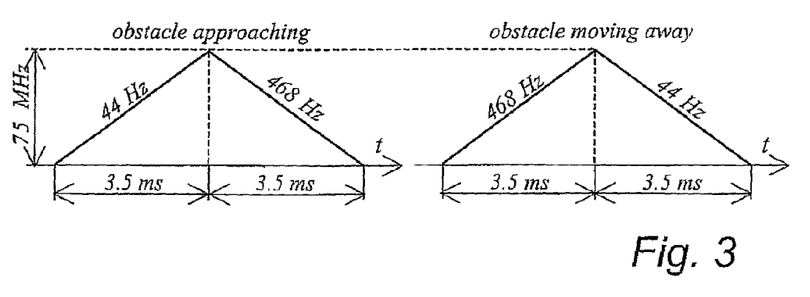
FIG. 3 shows an the triangular modulation waveform of FIG. 2b with example values of beat frequencies from up-sweeps and down-sweeps for an obstacle at distance R=1.5 m and moving at velocity $V_O$=0.5 m/s.

The Doppler component $F_D$ can be determined from $$F_V = \frac{2V_O}{\lambda_O} \tag{5}$$

where $\lambda_O$ is the wavelength of the transmitted radar signal. For example, when the relative velocity $V_O=0.5$ m/s the Doppler component of the beat frequency observed in a 77-GHz radar system (i.e. $\lambda_O=3.9$ mm) is $F_V \approx 256$ Hz. Therefore, when an obstacle at a distance R=1.5 m is moving at the velocity $V_O=0.5$ m/s, the composite beat frequency $F_B$ will be equal either to 44 Hz or 468 Hz, depending whether it is determined from up-sweeps or down-sweeps of the triangular carrier modulating waveform, as shown in FIG. 3.

While the composite beat frequency of 468 Hz can be measured within, say, 3.5 ms, in a reliable way, the frequency of 44 Hz is much too low to be of practical use, because the required measurement time is too long. Therefore, an additional measurement of the frequency of the Doppler component alone is required to determine both the distance R and the velocity $V_O$ of an obstacle of interest. This can be accomplished by incorporating a segment of a constant frequency into an FM-CW signal with triangular FM. One such a solution is a periodical trapezoidal FM waveform shown in FIG. 4, a technique (e.g. U.S. Pat. No. 7,190,305) which is known to those skilled in art.

Figure 5:
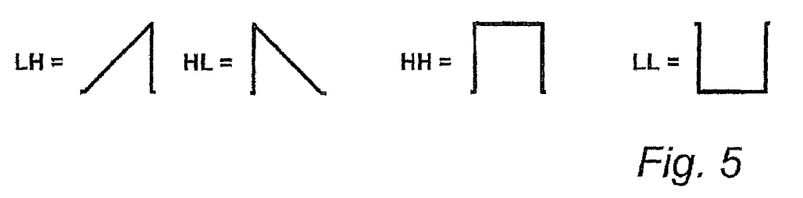
FIG. 5 shows four elementary segments {HH, LL, LH, HL} that may be used for generating a frequency modulating waveform suitable for multi-user applications.

The use of constant-frequency segments as parts of an FM-CW signal makes one of the two frequency sweeps (one up-sweep and one down-sweep) redundant. Consequently, only the frequency sweep resulting in a larger value of the composite beat frequency $F_B$ should be retained. An embodiment of the present invention utilises an adaptive procedure including the following steps Using a triangular frequency modulation to decide which of the two frequency sweeps should be retained Designing a frequency modulation signal by suitably combining signal segments from the set comprising four elementary waveforms {HH, LL, LH, HL}, as shown in FIG. 5.

If a larger beat frequency is observed for the down-sweeps, then the up-sweep segments should be eliminated (object is approaching). If a larger beat frequency is observed for the up-sweeps, then the down-sweep segments should be eliminated (object is moving away). This technique shall be referred to as adaptive trapezoidal frequency modulation (ATFM).

An optimum ATFM signal for approaching obstacles may be constructed by using (with repetition) elementary waveforms HH, LL, HL. However, for some applications, such as in a multi-user environment, it is beneficial if the order in which those elementary waveforms appear may be made unpredictable with the following probabilities:

$$Pr(HL)=\frac{1}{2} Pr(LL)=Pr(HH)=\frac{1}{4}$$

Figure 7A:
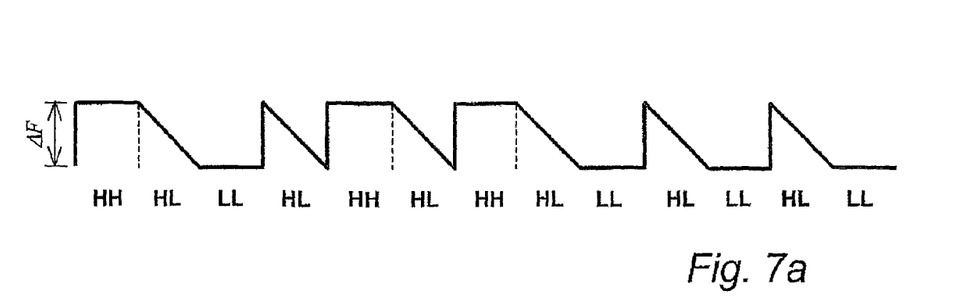
FIG. 7a shows an example of a frequency modulating waveform consisting of randomly selected elementary segments {HH, LL, HL} appropriate for ranging approaching obstacles.

The example shown in FIG. 7a shows a string of symbols that represent an ATFM signal designed for detecting approaching obstacles.

In a similar manner, an optimum ATFM signal for detecting obstacles that move away may be constructed by using (with repetition) elementary waveforms HH, LL, LH. Again, in some applications, it may be beneficial to make the order in which those elementary waveforms appear unpredictable with the following probabilities:

$$Pr(LH)=\frac{1}{2} Pr(LL)=Pr(HH)=\frac{1}{4}$$

Figure 7B:
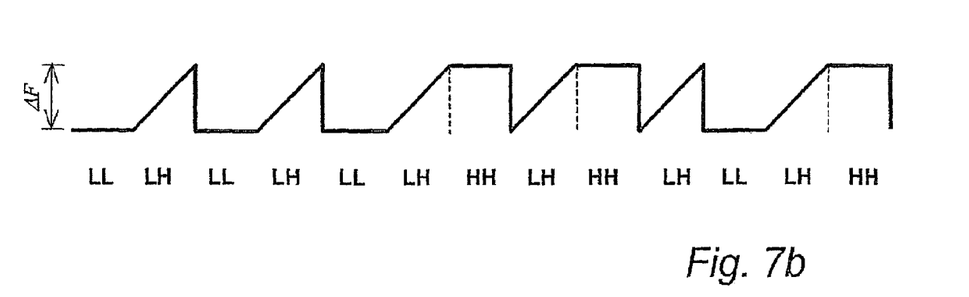
FIG. 7b shows an example of a frequency modulating waveform consisting of randomly selected elementary segments {HH, LL, LH} appropriate for ranging obstacles that move away.

The example shown in FIG. 7b shows a string of symbols that represent an ATFM signal designed for detecting obstacles that move away.

The analysis of the structure of an optimal ATFM signal has shown that the elementary waveforms used for the signal design may be replaced by four waveform doublets: HH&HL, HL&LL, LH&HH and LL&LH:

for approaching obstacles: {(HH&HL), (HL&LL)} with Pr[(HH&HL)]=Pr[(HL&LL)]=½ for obstacles that move away: {(LH&HH), (LL&LH)} with Pr[(LH&HH)]=Pr[(LL&LH)]=½

Figure 6:
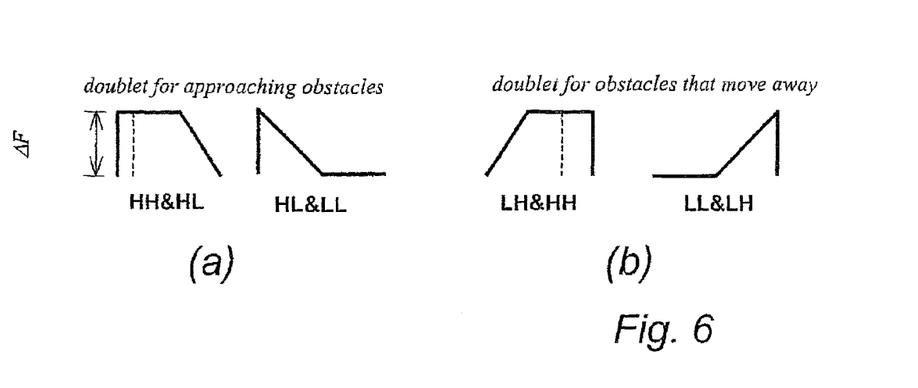
FIG. 6 shows an example of waveform doublets suitable for ranging a) approaching obstacles, and b) obstacles that move away.

The four waveform doublets are shown in FIG. 6.

Combining a triangular FM (during the initial detection cycle) with an adaptive trapezoidal FM (during the subsequent estimation cycle) will result in improved performance of an automotive FM-CW system.

In order to obtain an accurate Doppler estimate, the duration of the constant-frequency segments, (HH) and (LL), may be extended with respect to that of the frequency up-sweep and down-sweep, (LH) and (HL), respectively

BRIEF DESCRIPTION OF THE DRAWINGS

An exemplary embodiment of the present invention will now be described with reference to the attached figures in which.

DETAILED DESCRIPTION OF THE PREFERRED EMBODIMENT

Figure 8:
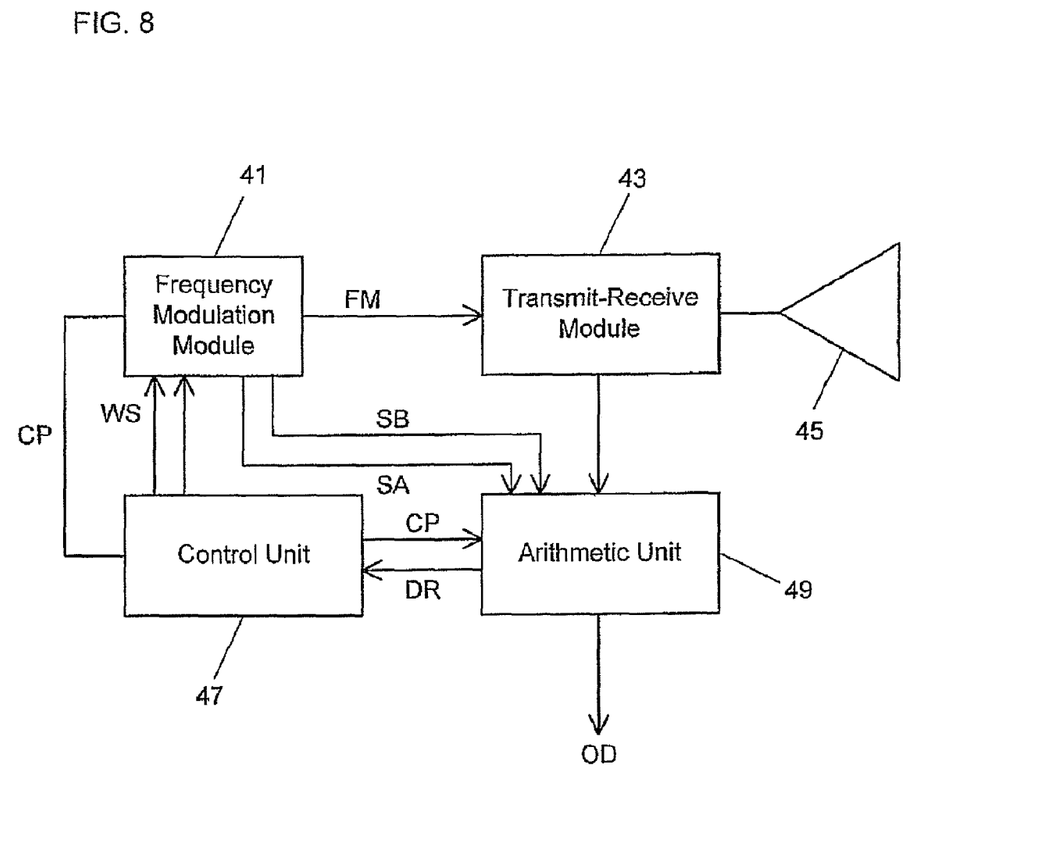
FIG. 8 shows a functional block diagram of an FM-CW automotive radar utilizing Adaptive Trapezoidal Frequency Modulation.

A functional block diagram of an FM-CW automotive radar utilizing an Adaptive Trapezoidal Frequency Modulation technique is presented in FIG. 8. A frequency-modulation module 41 provides a frequency-modulating waveform FM which is supplied to a transmit-receive module 43. The nature of the frequency-modulating waveform FM is determined using waveform select bits WS output by a control unit 47. The frequency-modulating waveform FM controls the frequency of a voltage-controlled oscillator (not shown in FIG. 8) forming part of the transmit-receive module 43. In this embodiment, the frequency of the signal output by the voltage-controlled oscillator is proportional to the voltage of the frequency-modulating waveform.

In a similar manner to that described with reference to FIG. 1 above, the frequency-modulated signal output by the voltage-controlled oscillator is coupled to a power amplifier and a down-converter. The amplified signal output by the power amplifier is coupled to an antenna 45, and a reflected signal detected by the antenna 45 is coupled to a low-noise amplifier. The output of the low-noise amplifier is then input to the down-converter causing the down-converter to output a beat signal representative of the frequency difference between the transmitted and reflected signals.

An arithmetic unit 49 processes the beat signal output by the transmit-receive module 43 to determine output data OD including the estimated range to, and velocity of, the object. The arithmetic unit 49 also outputs a signal DR, providing information concerning the velocity measurement such as whether the object is approaching or moving away, to the control unit 47.

The control unit 47 determines the waveform-select bits WS sent to the frequency modulation module 41 based in part on the content of the signal DR from the arithmetic unit 49. In particular, as will be discussed in more detail, the control unit 47 decides in an adaptive manner on the value of select bits WS depending on the direction of motion (i.e. towards or away from radar antenna) of the ranged obstacle. In this preferred embodiment the estimate of direction of object motion is made by periodically employing a segment of FM triangular waveform as the frequency-modulating waveform FM.

The control unit 47 also outputs periodic timing pulses CP to the frequency modulation module 41 and the arithmetic unit 49.

Figure 9:
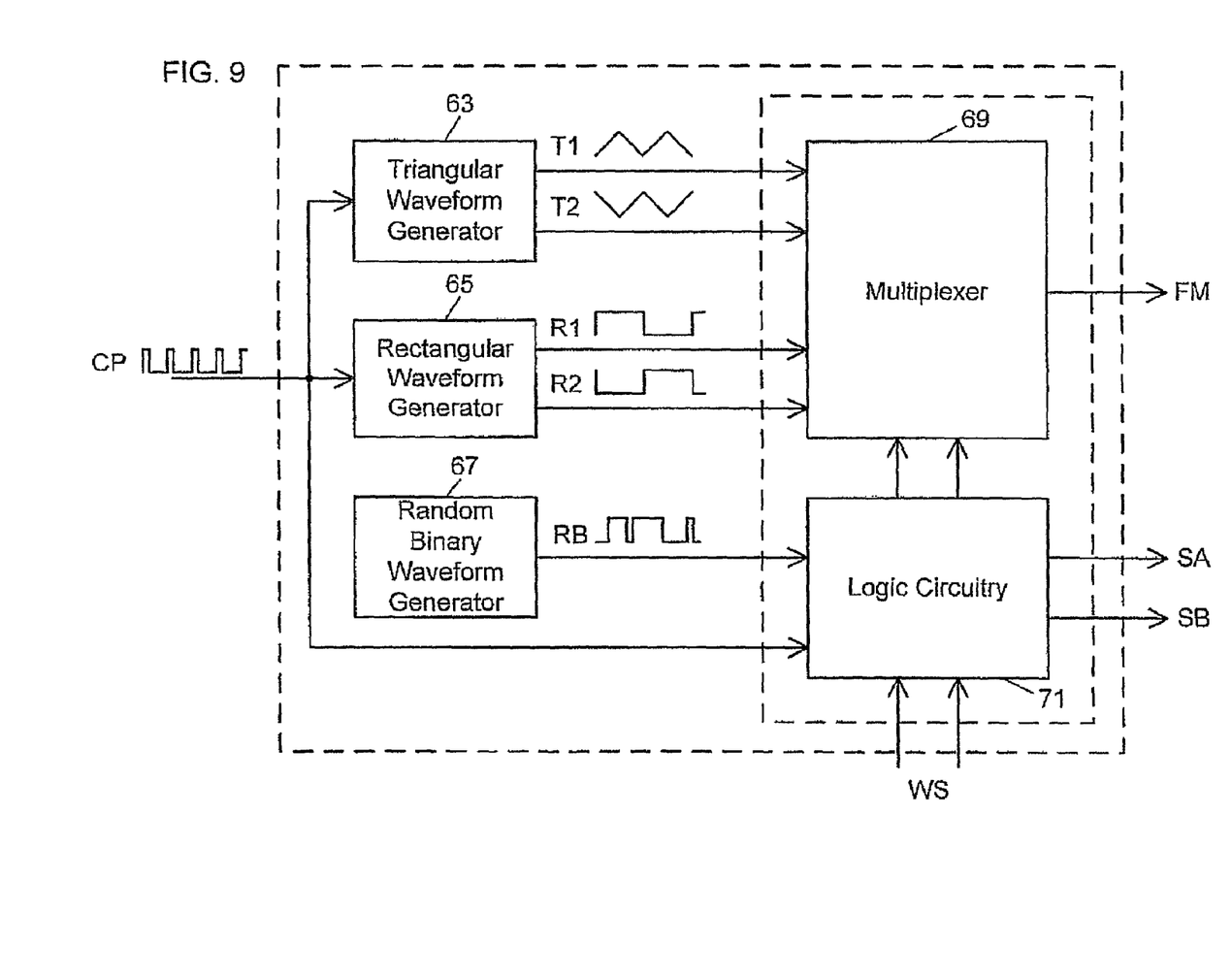
FIG. 9 shows a functional block diagram of an Adaptive Trapezoidal Frequency Modulator and associated modules.

The details of the frequency-modulation module 41 of FIG. 8 are presented in FIG. 9. The periodic timing pulses CP received from the control unit 47 are input to a triangular waveform generator 63, a rectangular waveform generator 65, and logic circuitry 71.

The triangular waveform generator 63 generates a first triangular waveform signal T1 with a period two times longer than that of the timing pulses CP and a second triangular waveform signal T2 which corresponds to the first triangular waveform signal shifted by a phase of 180°. In this way, as the first triangular waveform signal T1 increases the second triangular waveform signal T2 decreases, and vice versa.

The rectangular waveform generator 65 generates a first rectangular waveform R1 with a period four times longer that that of the timing pulses, and a second rectangular waveform signal R2 which corresponds to the first rectangular waveform signal R1 shifted by a phase of 180°. In this way, when the first rectangular waveform R1 is in a high state the second rectangular waveform R2 is in a low state and vice versa.

The first and second triangular waveform signals T1, T2 and the first and second rectangular waveform signals R1 and R2 are input to respective data inputs of a multiplexer 69. The output of the multiplexer 69 forms the frequency-modulating waveform FM.

The random binary waveform generator 67 generates a random binary waveform RB, which is input to logic circuitry 71 together with the waveform select bits WS. In this embodiment, the random binary waveform generator 67 generates a binary waveform for which the probability of the waveform having a value 1 is approximately equal to the probability of the waveform having a value 0 over time.

Figure 10:
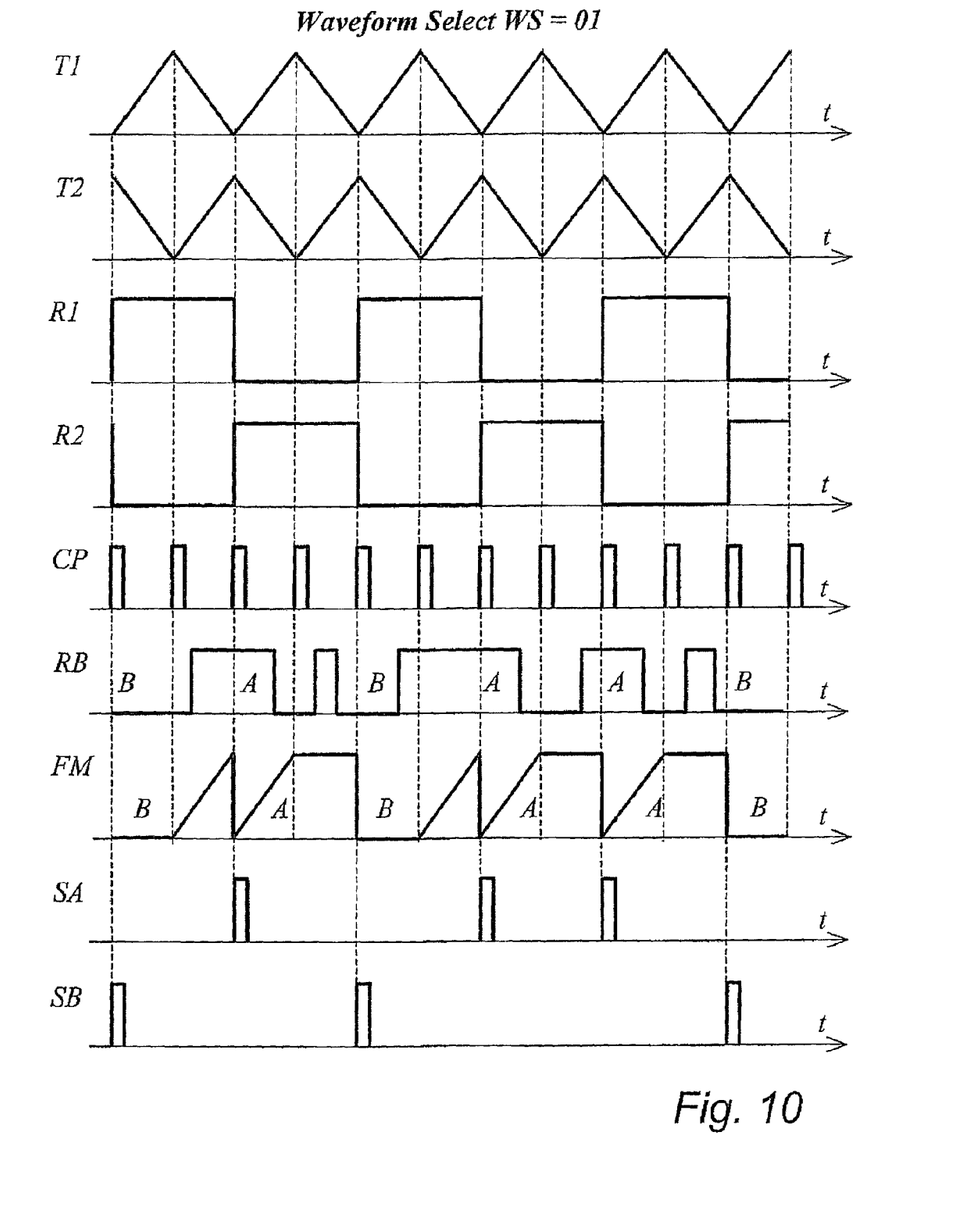
FIG. 10 shows waveforms generated by an Adaptive Trapezoidal Frequency Modulator for obstacles that move away.
Figure 11:
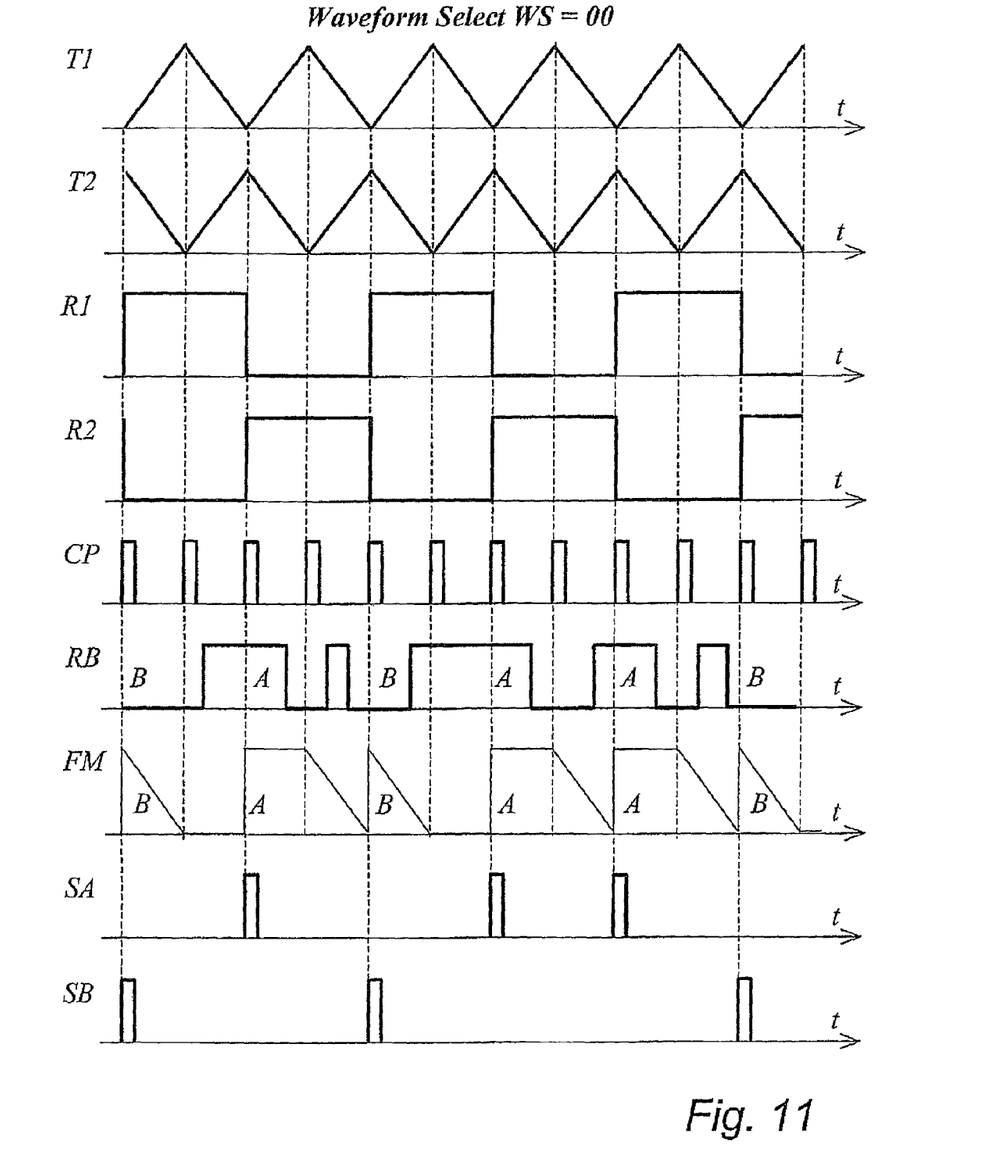
FIG. 11 shows waveforms generated by an Adaptive Trapezoidal Frequency Modulator for approaching obstacles.

As discussed in more detail below, the logic circuitry 71 processes the waveform select bits WS and the random binary waveform RB to generate address signals which are input to the multiplexer 69 such that the waveform FM is the same as T1 (when WS=10 or 11) or may be composed of the randomly selected doublets shown in FIG. 6a and FIG. 6b, depending on the direction of movements of the ranged obstacle (i.e. WS=01 for obstacles that move away, WS=00 for approaching obstacles). The complete sets of waveforms for when values WS=01 and when WS=00 are shown in FIG. 10 and FIG. 11 respectively.

Figure 12:
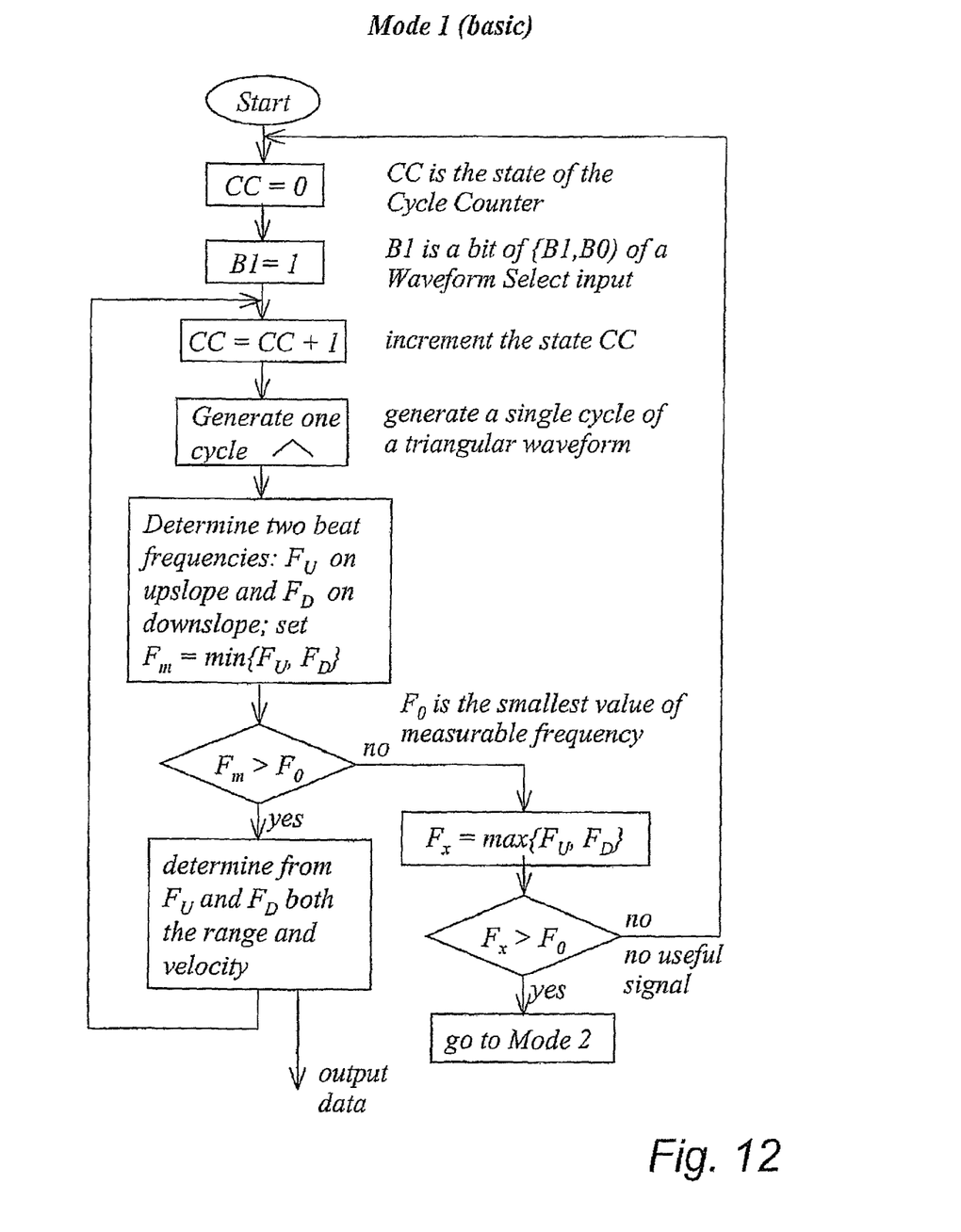
FIG. 12 shows a flow-chart for operation of an Adaptive Trapezoidal Frequency Modulator in Mode 1 (basic)
Figure 13:
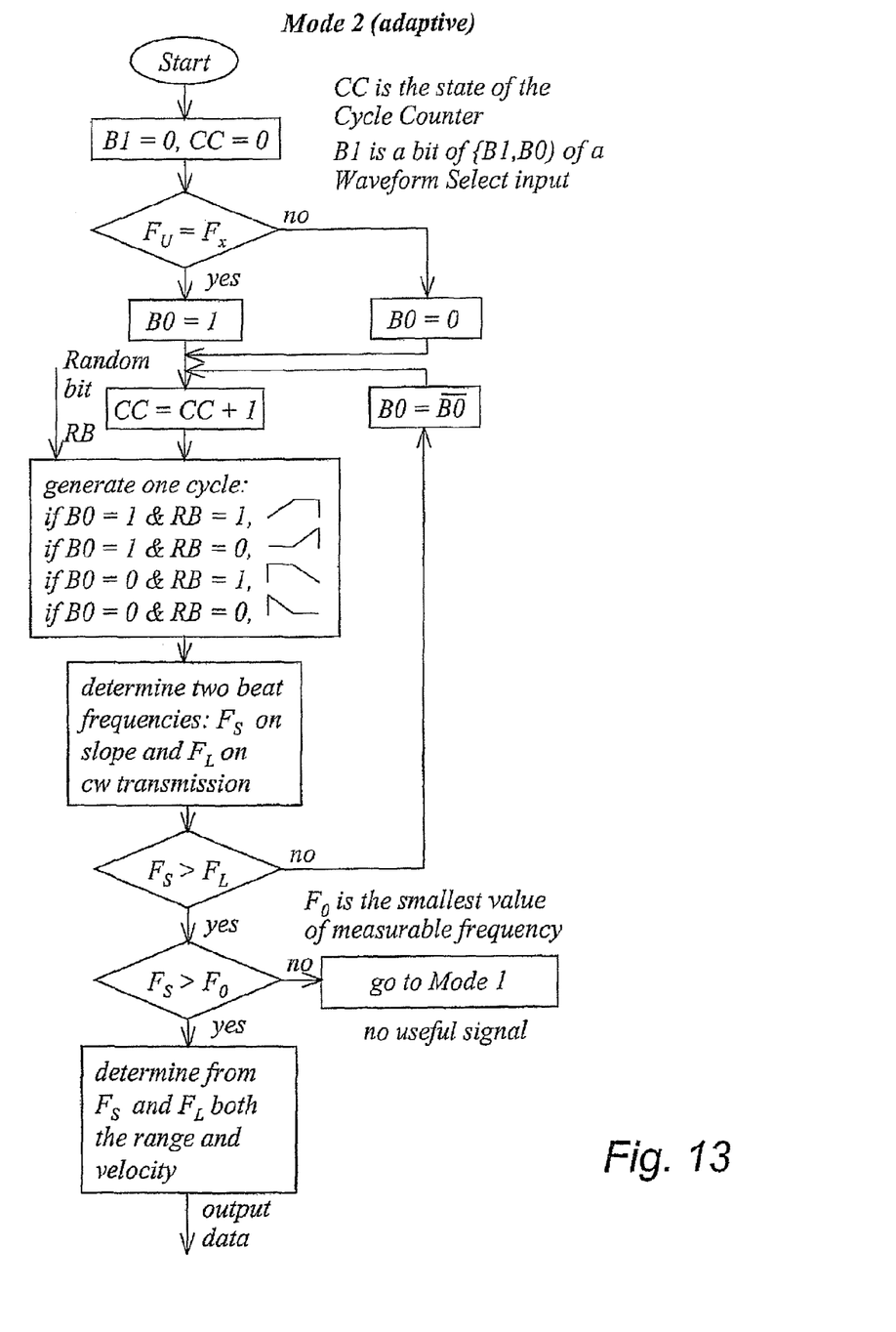
FIG. 13 shows a flow-chart for operation of an Adaptive Trapezoidal Frequency Modulator in Mode 2 (adaptive).

In this embodiment, the FM-CW automotive radar operates in two modes: Mode 1 (basic) and Mode 2 (adaptive). In Mode 1, the first of the waveform select bits is set to 1 (i.e. WS=10 or 11) while in Mode 2 the first of the waveform select bits is set to 0 (i.e. WS=00 or 01). The second of the waveform select bits is set to 1 if it is determined that the object is moving away and is set to 0 if it is determined that the object is approaching. The flow charts explaining the logical functions performed by the FM-CW automotive radar in these two Modes are shown in FIG. 12 and FIG. 13 respectively.

During an initial detection cycle, the FM-CW automotive radar operates in Mode 1. This involves the control unit 47 setting the waveform select bits WS to 10, in response to which the logic circuitry 71 sets the address bits input to the multiplexer 69 so that the frequency modulation module 41 provides a periodic triangular FM waveform (e.g. the first triangular waveform T1) in order to establish the direction of movement of the ranged obstacles. Each generated cycle yields beat signals having two frequencies $F_U$ and $F_D$, which correspond with up- and down-slopes of the triangular FM waveform, respectively. If the frequency $F_m$, equal to the smaller of these two frequencies $F_U$ and $F_D$, is larger than the smallest possible measurable frequency $F_0$, then the range and velocity are determined directly from frequencies $F_U$ and $F_D$ using well known state-of-the-art techniques (e.g. from equations 1 and 2). The processing then continues in Mode 1 with the generation of another cycle of the triangular waveform.

If the frequency $F_x$, equal to larger of the two frequencies $F_U$ and $F_D$, is smaller than frequency $F_0$ then no useful estimates may be obtained. However, if the frequency $F_x$ is larger than $F_0$ but the frequency $F_m$ is less than $F_0$ then the range and velocity estimation is continued using the Mode 2 (adaptive) set of operations shown in FIG. 13. Here, the decision on generating one of the four possible doublets is taken based on the second of the waveform select bits WS, i.e. the one which indicates the direction of motion of the object, and the random binary waveform RB.

The value of the second waveform select bit depends on frequency $F_x$ selection performed in Mode 1. If frequency $F_x=F_U$ it is assumed that the objects moves away and hence the second waveform select bit is set to 1. Alternatively, when $F_x \ne F_U$ (approaching objects case) the second waveform select bit is set to 0.

As will be apparent from FIG. 10, in Mode 2 in the object moving away state if the random binary waveform RB has a value 1, then the logic circuitry 71 inputs address bits to the multiplexer 69 to cause a first elementary waveform to be emitted consisting of one timing pulse period during which the signal increases from a low value to a high value followed by one timing pulse period during which the signal is maintained at the high value. If the random binary waveform RB has a value 0 then the logic circuitry 71 inputs address bits to the multiplexer 69 to cause a second elementary waveform to be emitted consisting of one timing pulse period during which the signal is maintained at the low value followed by one timing pulse period during which the signal increases from the low value to the high value. The first elementary waveform (hereafter referred to as type A) and the second elementary waveform (hereafter called type B) therefore correspond with the doublet pair for objects moving away illustrated in FIG. 6(b).

As will be apparent from FIG. 11, in Mode 2 in the object approaching state if the random binary waveform RB has a value 1, then the logic circuitry 71 inputs address bits to the multiplexer 69 to cause a third elementary waveform to be emitted consisting of one timing pulse period during which the signal is maintained at a constant high voltage followed by one timing pulse period during which the voltage decreases from the high voltage to the low voltage. If the random binary waveform RB has a value 0 then the logic circuitry 71 inputs address bits to the multiplexer 69 to cause a fourth elementary waveform to be emitted consisting of one timing pulse period during which the signal decreases from the high voltage to the low voltage followed by one timing pulse period during which the signal is maintained at the low voltage. The third elementary waveform (hereafter referred to as type A) and the fourth elementary waveform (hereafter called type B) therefore correspond with the doublet pair for approaching objects illustrated in FIG. 6(a).

As shown in FIGS. 10 and 11, the logic circuitry 71 also outputs synchronisation pulses SA and SB which mark the beginning of each doublet type A and type B, respectively. The synchronisation pulse are directed to the arithmetic unit 49 to mark the section of beat signals with specific frequency that are used for estimation of object's range R and velocity $V_O$.

The range and velocity are determined from beat frequencies $F_S$ and $F_L$ which correspond with linear slopes or CW transmission, respectively. If frequency $F_S$ is smaller than frequency $F_L$, then the second waveform select bit is negated and the process of doublet generation is repeated. If frequency $F_S$ is larger than frequency $F_L$ and also larger than frequency $F_0$, then the object range and velocity are determined. However, in the case when frequency $F_L$ is smaller than frequency $F_0$ the processing continues in Mode 1, as described above.

Because random selection of waveform doublets (type A or B) is performed with equal probability, the resulting FM waveform will be generated with maximum unpredictability, which is the optimum solution in multi-user applications such as collision-avoidance radar systems.

It will be appreciated that many forms of logic circuitry 71 could be used to achieve the desired address bits for each combination of input waveform select bits WS and random binary waveform RB value, the design of such logic circuitry being a routine design task. Further, the hardware implementation of the Frequency Modulation Module 41 described with reference to FIG. 9 could be replaced by a software implementation.

The foregoing description of preferred embodiments of the invention has been presented for the purpose of illustration and description only. It is not intended to be exhaustive or to limit the invention to the precise form and applications disclosed. In light of the foregoing description, it is evident that many alterations, modifications, and variations will enable those skilled in the art to utilize the invention in various embodiments suited to the particular use contemplated.

The invention claimed is:

1. A method for determining at least one of the distance to and the speed of an object, the method comprising the steps of:
   determining an indication of whether the object is approaching or moving away;
   generating an interrogation signal comprising a sequence consisting of segments at constant frequency and segments of varying frequency, wherein if the determining step indicates the object is approaching then the varying frequency segments have decreasing frequency and if the determining step indicates that the object is moving away then the varying frequency segments have increasing frequency;
   transmitting the interrogation signal and detecting a version of the interrogation signal reflected from the object; and
   determining at least one of the distance to and speed of the object from a combination of the interrogation signal and the reflected version of the interrogation signal.

2. A method according to claim 1, wherein the determining step comprises:
   generating a frequency-modulated signal having segments of increasing frequency and segments of decreasing frequency, and transmitting the frequency-modulated signal;
   detecting a reflected signal from the object;
   combining the frequency-modulated signal and the reflected signal to derive a first beat frequency corresponding to the sections of increasing frequency and a second beat frequency corresponding to the sections of decreasing frequency;
   determining which of the first beat frequency and the second beat frequency is higher.

3. A method according to claim 1, wherein the interrogation signal generating step comprises generating a random sequence of constant frequency segments and varying frequency segments.

4. A method according to claim 3, wherein the interrogation signal generating step comprises generating a random signal, and selecting from a set of elementary waveforms in accordance with whether the object is approaching or moving away and the value of the random signal, the set of elementary waveforms comprising:
   a first elementary waveform consisting of a first segment at a first frequency followed by a second segment during which the frequency decreases from the first frequency to a second frequency;
   a second elementary waveform consisting of a first segment during which the frequency decreases from the first frequency to the second frequency followed by a second segment at the second frequency;
   a third elementary waveform consisting of a first segment during which the frequency increases from the second frequency to the first frequency followed by a second segment at the first frequency; and
   a fourth elementary waveform consisting of a first segment at the second frequency followed by a second segment during which the frequency increases from the first frequency of the second frequency.

5. A method according to claim 4, wherein the random signal generating step generates a random binary signal.

6. A method according to claim 4, wherein the generated random signal is such that for approaching objects the probabilities of the first and second elementary waveforms occurring in the interrogation signal is approximately equal, and for objects moving away the probabilities of the third and fourth elementary waveforms appearing in the interrogation signal are approximately equal.

7. A method according to claim 1, further comprising the preliminary steps of:
   testing if said at least one of the distance and speed can be determined using an interrogation signal having segments of increasing frequency and decreasing frequency;
   if the testing step determines that said at least one of the distance and speed can be determined using an interrogation signal having segments of increasing frequency and decreasing frequency then proceeding with that interrogation signal; and
   if the testing step determines that said at least one of the distance and speed can be determined using an interrogation signal having segments of increasing frequency and decreasing frequency then proceeding in accordance with any preceding claim.

8. An apparatus for determining at least one of the distance to and the speed of an object, the apparatus comprising:
   means for determining an indication of whether the object is approaching or moving away;
   means for generating an interrogation signal comprising a sequence consisting of segments at constant frequency and segments of varying frequency;
   means for transmitting the interrogation signal and detecting a version of the interrogation signal reflected from the object; and
   means for determining at least one of the distance to and speed of the object from a combination of the interrogation signal and the reflected version of the interrogation signal,
   wherein the generating means is arranged such that said segments of varying frequency have decreasing frequency if the determining means determines that the object is approaching and said segments of varying frequency have increasing frequency if the determining means determines that the object is moving away.

9. An apparatus according to claim 8, wherein the determining means comprises:
 means for generating a frequency-modulated signal having segments of increasing frequency and segments of decreasing frequency, and transmitting the frequency-modulated signal;
 means for detecting a reflected signal from the object;
 means for combining the frequency-modulated signal and the reflected signal to derive a first beat frequency corresponding to the sections of increasing frequency and a second beat frequency corresponding to the sections of decreasing frequency; and
 means for determining which of the first beat frequency and the second beat frequency is higher.

10. An apparatus according to claim 8, wherein the interrogation signal generating means comprises means for generating a random sequence of constant frequency segments and varying frequency segments.

11. An apparatus according to claim 10, wherein the interrogation signal generating means comprises:
 means for generating a random signal; and
 means for selecting from a set of elementary waveforms in accordance with whether the object is approaching or moving away and the value of the random signal, the set of elementary waveforms comprising:
  a first elementary waveform consisting of a first segment at a first frequency followed by a second segment during which the frequency decreases from the first frequency to a second frequency;
  a second elementary waveform consisting of a first segment during which the frequency decreases from the first frequency to the second frequency followed by a second segment at the second frequency;
  a third elementary waveform consisting of a first segment during which the frequency increases from the second frequency to the first frequency followed by a second segment at the first frequency; and
  a fourth elementary waveform consisting of a first segment at the second frequency followed by a second segment during which the frequency increases from the first frequency of the second frequency.

12. An apparatus according to claim 11, wherein the random signal generating means is operable to generate a random binary signal.

13. An apparatus according to claim 11, wherein the generated random signal is such that for approaching objects the probabilities of the first and second elementary waveforms occurring in the interrogation signal is approximately equal, and for objects moving away the probabilities of the third and fourth elementary waveforms appearing in the interrogation signal are approximately equal.

14. An apparatus according to claim 8, further comprising means for testing if said at least one of the distance and speed can be determined using an interrogation signal having segments of increasing frequency and decreasing frequency,
 wherein the apparatus is arranged to use an interrogation signal having segments of increasing frequency and decreasing frequency if said testing means determines that said at least one of the distance and speed can be determined with that interrogation signal; and
 wherein the apparatus is arranged to use said interrogation signal comprising a sequence consisting of segments at constant frequency and segments of varying frequency if the testing means determines that said at least one of the distance and speed cannot be determined using an interrogation signal having segments of increasing frequency and decreasing frequency.

* * * * *